June 10, 1958 H. M. KONRAD ET AL 2,838,231

AUTOMATIC OVERDRAFT DETECTION LOCK FOR ACCOUNTING MACHINES

Filed Jan. 26, 1953 6 Sheets-Sheet 1

INVENTORS
HERMAN M. KONRAD &
RUDOLPH J. MOSER
BY Carl Beust
Ayres D. Stoddard
THEIR ATTORNEYS June 10, 1958 H. M. KONRAD ET AL 2,838,231

AUTOMATIC OVERDRAFT DETECTION LOCK FOR ACCOUNTING MACHINES

Filed Jan. 26, 1953 6 Sheets-Sheet 2

INVENTORS
HERMAN M. KONRAD &
RUDOLPH J. MOSER
BY Carl Beust
Ayres D. Stoddard
THEIR ATTORNEYS INVENTORS
HERMAN M. KONRAD &
RUDOLPH J. MOSER
BY Carl Beust
Ayres D. Stoddard
THEIR ATTORNEYS INVENTORS
HERMAN M. KONRAD &
RUDOLPH J. MOSER
BY Carl Beust
Ayres D. Stoddard
THEIR ATTORNEYS INVENTORS
HERMAN M. KONRAD &
RUDOLPH J. MOSER
BY Carl Beust
Ayres D. Stoddard
THEIR ATTORNEYS June 10, 1958

H. M. KONRAD ET AL

AUTOMATIC OVERDRAFT DETECTION LOCK FOR ACCOUNTING MACHINES 2,838,231

Filed Jan. 26, 1953

6 Sheets-Sheet 6

INVENTORS
HERMAN M. KONRAD &
RUDOLPH J. MOSER

BY Carl Beust
Ayres D. Stoddard

THEIR ATTORNEYS

Patented June 10, 1958

2,838,231

AUTOMATIC OVERDRAFT DETECTION LOCK FOR ACCOUNTING MACHINES

Herman M. Konrad and Rudolph J. Moser, Dayton, Ohio, assignors to The National Cash Register Company, Dayton, Ohio, a corporation of Maryland Application January 26, 1953, Serial No. 333,046

3 Claims. (Cl. 235—60.2)

The present invention relates to accounting machines and similar business machines. In the illustrated form, the invention is embodied in and directed to a machine for registering and recording various types of posting transactions in banks and also other types of transactions incident to the banking business, and is directed particularly to the automatic overdraft control for such types of machines, said automatic overdraft control embodying a novel automatic overdraft detection lock.

This invention is an improvement over the invention shown in the United States Letters Patent to Pascal Spurlino, William M. Carroll, Arthur R. Colley, and Alfred G. Kibler, No. 2,375,594, and also shown in the patent to Pascal Spurlino, Everett H. Placke, Willis E. Eickman, and Arthur G. Kramer, No. 2,373,510.

The present invention is embodied in a machine of the general type disclosed in the following United States patents, to which reference may be had for a complete showing and description of standard mechanism not fully disclosed herein: United States Patents No. 1,619,796, No. 1,747,397, and No. 1,761,542, issued, respectively, on March 1, 1927, February 18, 1930, and June 3, 1930, to Bernis M. Shipley; Patent No. 2,175,346, issued on October 10, 1939, to Maximilian M. Goldberg; Patent No. 2,141,332, issued on December 27, 1938, to Charles H. Arnold; and Patent No. 1,693,279, issued on November 27, 1928, to Walter J. Kreider.

The machine embodying the present invention, and as illustrated herein and in the Patent No. 2,373,510, is commonly referred to as a "commercial posting" machine or a "bank service" machine and is used by banks and similar business institutions for the posting of individual checking accounts and other types of posting operations incident to the banking business.

For illustrative purposes, the present invention is embodied in a machine which has electrically-operated means under control of the control keyboard for releasing the machine for operation, as fully illustrated and described in the United States application for Letters Patent filed by Pascal Spurlino, Frank B. Moser, George L. Wheeler, and Leonard Struve, Serial No. 87,026, on April 12, 1949, which issued into United States Patent No. 2,698,715 on January 4, 1955.

Normally, in certain types of banking or commercial bank posting machines, such as that disclosed in the Spurlino et al. Patent No. 2,373,510, the keys of the total control row and the keys in the transaction rows are what are known in the art as operating keys; that is, when those keys are depressed, the machine-releasing mechanism is tripped, and the machine goes through its normal cycle of operation. However, in such machines it was necessary to move mechanism by the depression of the key to actually cause the tripping of the release mechanism. However, with the mechanism shown in the above-mentioned patent application of Spurlino et al., and with that shown in this present application, the tripping of the release mechanism is done electrically. The electrical means is energized by the depression of any one of the so-called operating keys. Consequently there is a considerably smaller amount of mechanism to be actually operated by the depression of a key, thus making the key action much easier.

All of the details of the mechanism, of course, are fully illustrated and described in the above-mentioned patent application.

It is common practice in the banking business to post each individual checking account daily, provided that such individual accounts remain active every day, and this posting includes the picking up of the old balance; the subtraction of debits, generally in the nature of checks drawn against the account from said old balance; the addition of credits, generally in the nature of deposits to said accounts; and the performing of a total-taking operation to arrive at a new balance.

When accounts are posted, they are printed on a combined statement and ledger card, which may be separated down through the center, the statement being mailed or given to the customer and the ledger card being retained by the bank in their file.

Of course, on this combined statement and ledger there are printed the amount of each check as it is deducted, the amount of the deposits as they are made, the date, and the balance which the customer maintains in his account.

Customary analysis of many accounts in bank bookkeeping department would reveal that these accounts are being conducted in a satisfactory manner; that is, the average daily balance would reflect a good balance on which to base service charges and credit information.

However, the depositor may knowingly or unknowingly use the account in a manner undesirable in good banking practice. An illustration of such a case would be where the customer draws checks and makes deposits to cover them the same day the checks are presented for payment.

The bank's records would show that adequate balances are being maintained because of these deposits. At first glance, the illustrated account has all of the attributes of being a desirable account for the bank to have.

The question is, however, is this a desirable account, and does the statement-ledger card reflect the real truth concerning the status of this particular account?

The actual truth concerning the status of an account of such a type is brought into clear focus when an overdraft condition is shown, before any deposit is posted to the account.

It is this particular type of account that the present invention is particularly adapted to control. In other words, the invention, as above mentioned, relates to automatic overdraft control, and this feature is brought about particularly and specifically by an automatic overdraft detection lock, which reveals an overdraft of a customer's account and eliminates the possibility of unknowingly posting a deposit that would offset it. This particular feature and control then obligates the bookkeeper to handle the overdraft in accordance with the policy which the bank has previously established with regard to accounts which are overdrawn. This is a new advance toward sound bank accounting practice.

In other words, with this feature the bank will always know what accounts are drawing against uncollected funds, and attention is therefore focused on any account which is not being conducted in the best interests of sound banking practice. The bank may, therefore, take appropriate action to collect service charges in such instances.

It is, therefore, an object of the present invention to provide machines which are used in bank establishments for the purpose of posting daily accounts of their customers with an automatic overdraft control.

It is another object of the present invention to automatically cause an overdraft detection lock to prevent operation of the machine after an overdraft occurs in any account which is being posted.

It is a further object of the present invention to prevent an immediate subsequent operation of the machine after an overdraft has taken place in the machine.

It is a further object of the present invention to prevent an operation of the machine which is initiated by the check key or the deposit key after an overdraft has occurred in the account which is being posted.

It is a still further object of the present invention to provide means and mechanism to release the overdraft detection lock to permit the operator to enter a deposit to the account.

It is another object of the present invention to unlock the overdraft detection lock to permit the operator to post another check against the account being posted, notwithstanding that there has been an overdraft in this account.

With these and incidental objects in view, the invention includes certain novel features of construction and combinations of parts, a preferred form or embodiment of which is hereinafter described with reference to the drawings which accompany and form a part of this specification.

GENERAL DESCRIPTION

Figure 1:
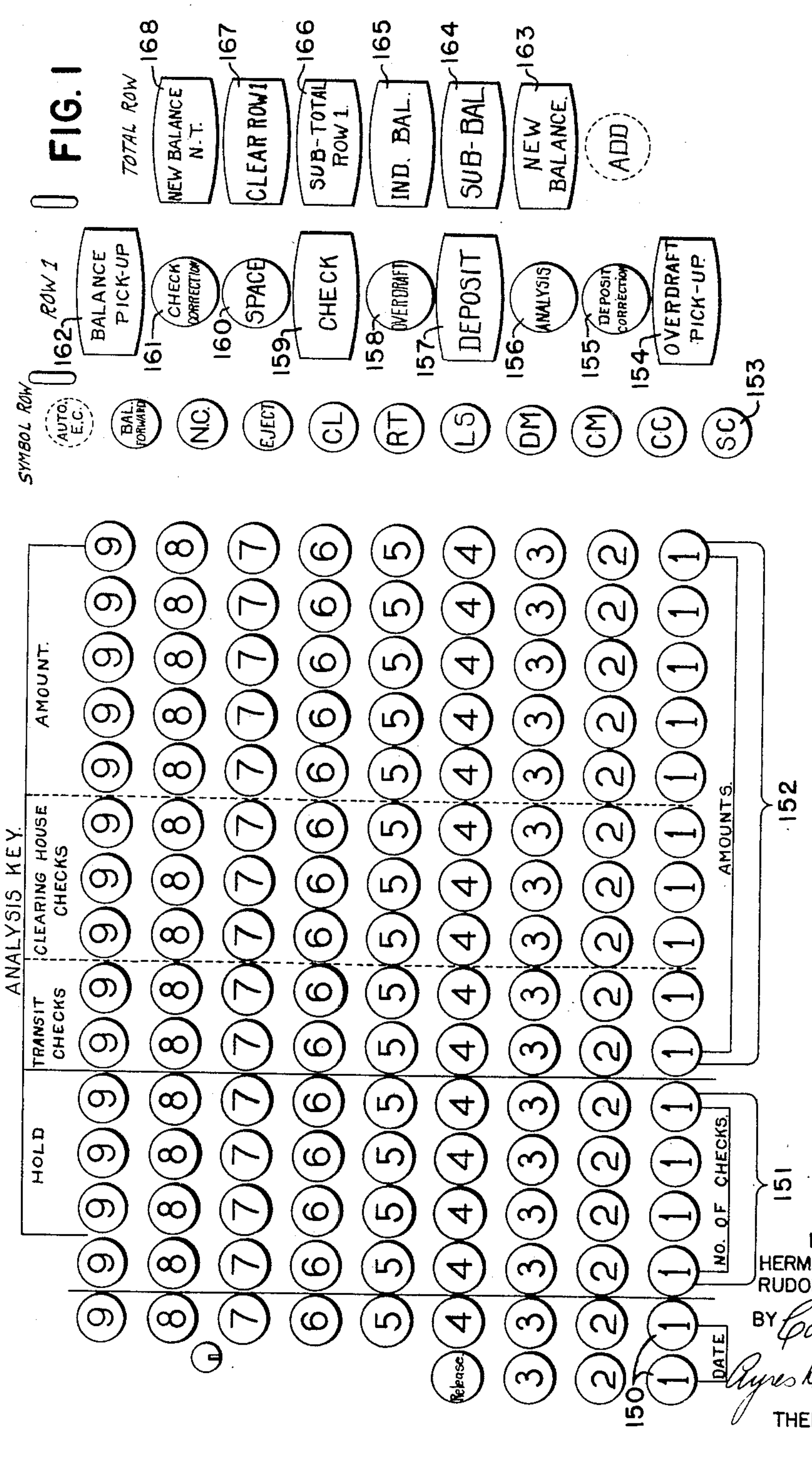
Fig. 1 is a diagrammatic view of the keyboard of the machine.

The machine embodying the present invention is of the general type disclosed in the Spurlino, Placke, Eickman, and Kramer Patent No. 2,373,510.

The machine is provided with a column-printing mechanism located at the front of the machine, for simultaneously recording identical data in one or more columns of insertable, combined statement and ledger sheets during one operating cycle of the printing mechanism.

Machines of this character are particularly useful in the preparation of statements and ledger cards used in banks, particularly because such statement-ledger cards are provided with a plurality of columns for the printing of data in the several columns.

In the present case, the specific example chosen to illustrate the system used in connection with the machine of this invention is the preparation by a banking institution of combined statement and ledger sheets of the individual checking accounts of a plurality of customers of said bank.

The main portion of the machine embodying this invention is of the standard construction well known in the art, and, as the standard mechanism is fully disclosed in the patents referred to at the beginning of this specification, such mechanism will be but briefly treated herein.

The machine chosen to illustrate the present invention has a plurality of rows of amount keys for entering items in the various totalizers with which the machine is equipped and for setting up corresponding type wheels to record the amounts on record material.

The machine also has a row of transaction keys, for use in entering positive and negative items in the various totalizers, and a row of symbol-printing keys, for controlling the printing of symbols for identifying the various items. Instead of the conventional total lever illustrated in some of the earlier patents mentioned above, this machine is equipped with a row of total keys, which control certain elements of the machine for reading and resetting operations.

Certain of the keys in the total control row and the keys in the transaction row of the machine illustrated in the Patent No. 2,373,510 are what are known in the art as operating keys; that is, when those keys are depressed, the machine-releasing mechanism is tripped, and the machine goes through its normal cycle of operation.

In such machines, it was necessary to move mechanism by the depression of the key to actually cause the tripping of the machine release mechanism.

In this present invention—that is, in the machine in which the present invention is embodied—this tripping of the machine release mechanism is accomplished by electrical means. The electrical means is energized by the depression of any one of the so-called operating keys.

Consequently, there is considerably less mechanism to be actually operated by the depression of a key, thus making the key action much easier.

In such types of key-releasing mechanism, it becomes necessary to make certain that the key which is operated is retained in its depressed position prior to the energization of the electrical means, which operates the machine release tripping mechanism.

There is associated with the row of transaction keys and also with the row of total keys a microswitch, which is operated upon depression of any one of the keys of the transaction bank, and upon operation of certain keys of the total bank. The depressions of these keys complete the circuit through the same electrical device which operates the tripping means for the machine release mechanism.

The machine illustrated herein is also provided with two totalizer lines; namely, an upper or No. 1 totalizer line, and a back or No. 2 totalizer line. The upper or No. 1 totalizer line supports the balance totalizer, which is often referred to as a crossfooter, and which is used for computing positive and negative amounts to arrive at new balances.

The back or No. 2 totalizer line has thereon four totalizers, two of which are add-subtract totalizers or crossfooters, one being used for keeping a total of the debit or check items and the other for keeping a total of the credit or deposit items. The reason add-subtract totalizers or crossfooters are used for totals of checks and deposits is that in the deposit correction operations it is necessary to make a subtract operation in order to secure a correct total in case of an error, and in check correction operations it is necessary to make an add operation to correct the error.

In connection with the automatic overdraft detection feature, a normal posting sequence is followed; that is, the old balance is picked up, followed by a check posting and then by a deposit posting. If the checks posted exceed the old balance picked up, the automatic overdraft detection lock will cause the machine to become inoperative. The machine thus immediately calls attention to the overdraft condition. Printing or non-printing of the overdraft is optional, in accordance with the policy of the bank.

Through the depression of the "Overdraft" key and the "Indicate Balance" key, the overdraft balance appears in the visible dials at the front of the machine. It has not been printed but is still in the machine. The bookkeeper may refer this condition to the head bookkeeper, to determine whether to return the item, or to show or not to show the condition. The "Check" control key, the "Deposit" control key, the "New Balance" extension key, the "Sub-Balance" key, the "Indicate Balance" key, and the "New Balance NT" key are all inoperative in this overdraft condition.

Now, if the overdraft is to be shown on the statement (this being optional with the bank), the Overdraft key and the Sub-Balance key are depressed, thereby recording the overdraft on the statement-ledger and the original journal, which is also used in the machine in connection with the statement ledger, as is usual in bank posting machines. Simultaneously, the depression of the overdraft key with either the "Check" key or the "Deposit" key releases the overdraft detection lock to permit continued posting of the media. A deposit to the account may now be posted, thus restoring the balance of the account to a current "black" balance. The overdraft has been recorded, in keeping with good banking practice, as evidence of the true status of the account. The recorded overdraft becomes the visible basis for correct credit information and proper service charge fees justifiably earned by the bank. Therefore, the bank may take appropriate action to collect the service charges which are due in such instances.

DETAILED DESCRIPTION

Figure 3:
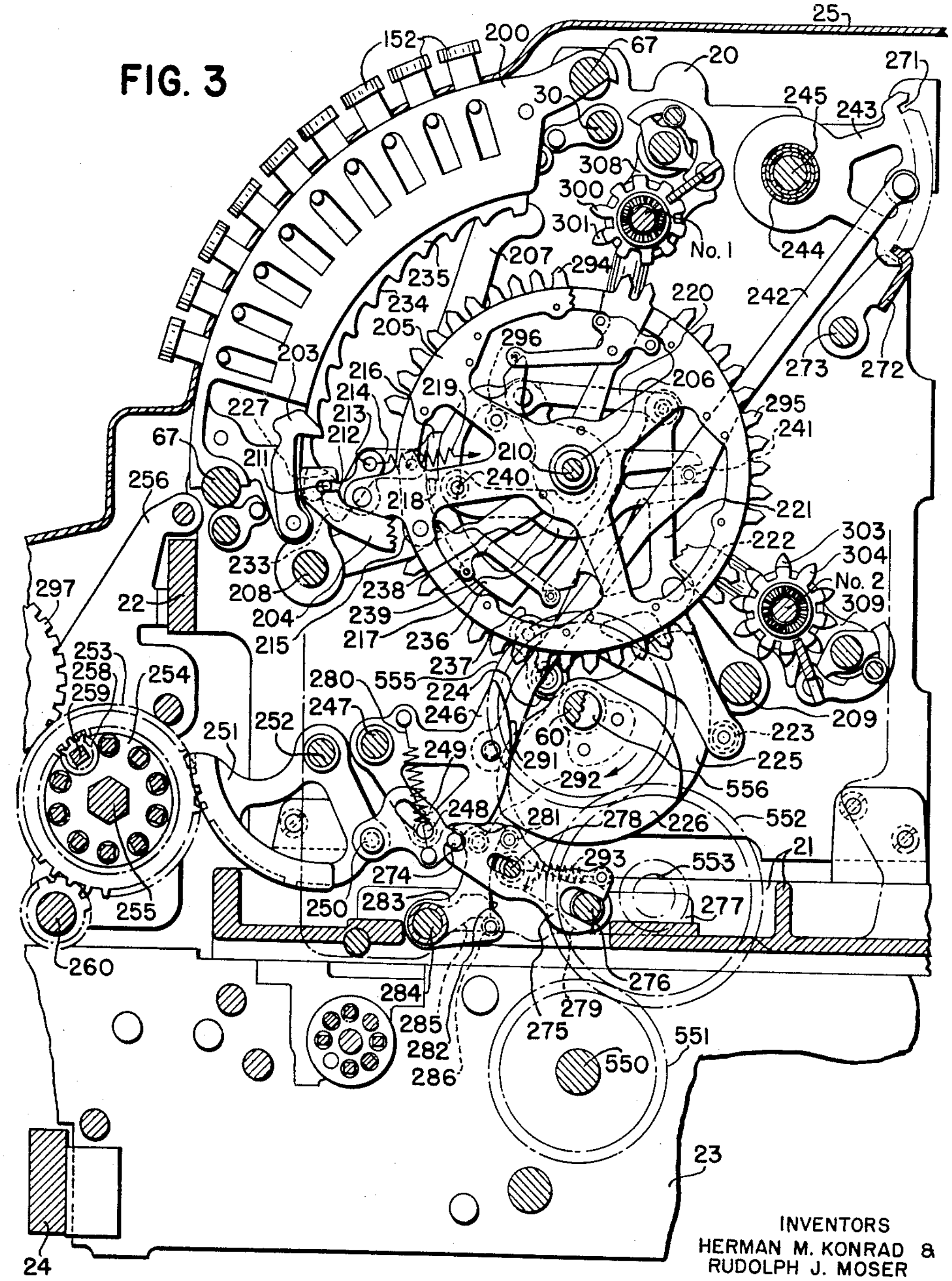
Fig. 3 is a sectional view through the machine taken to the right of one of the amount banks, showing the differential mechanism associated therewith and the drive from the main drive to the printer drive shaft.

The framework of the machine is substantially like that shown in the above-mentioned Spurlino, Placke, Eickman, and Kramer Patent No. 2,373,510, and therefore only a very brief description of the frame will be given herein, as only part of it is shown in this application. The machine side frames 20 (Figs. 3 and 6) (only one of which is shown) are mounted on a base 21 and are tied together at the front by a bar 22 and at the rear by a bar not shown. The side frames 20 and the base 21 are mounted on printer frames 23 (only one of which is shown), which are tied together near their front by tie bar 24 (Fig. 3).

The machine proper and also its printing mechanism are enclosed in a suitable cabinet 25 (Figs. 3 and 6), having the necessary hinged sections for access to certain parts of the machine by the operator whenever necessary.

Normally, the machine is electrically operated by a conventional type of motor, such as that disclosed in the Shipley patents referred to hereinbefore, and, in addition, a hand crank is provided for operating the machine manually, when necessary.

*Machine release mechanism*

Figures 7, 8, 9, 10, 11:
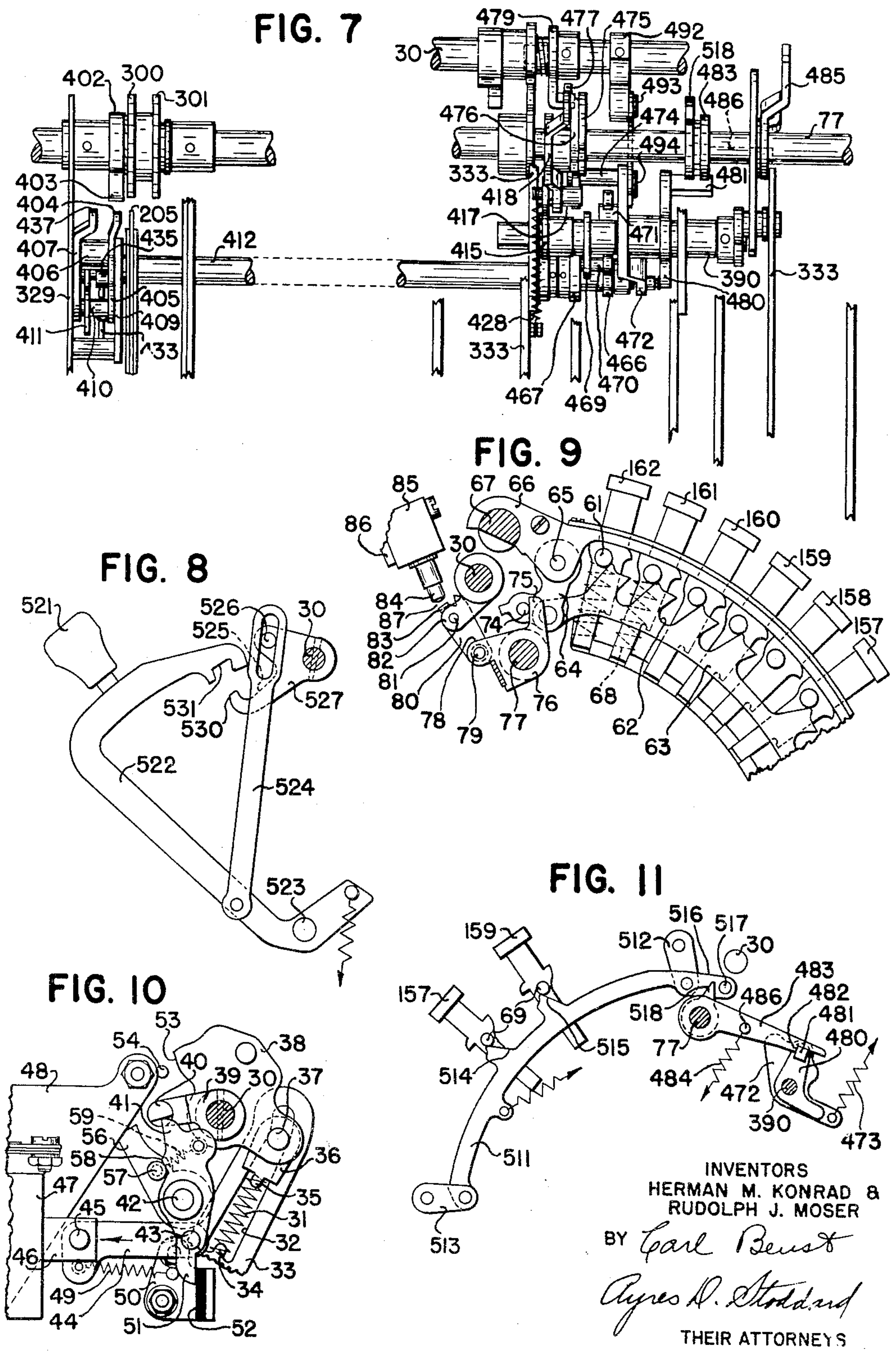
Fig. 7 is a fragmentary front view, showing a portion of the overdraft mechanism and its control over the machine-releasing mechanism.
Fig. 8 is a detail of the key release lever, by means of which any amount keys erroneously depressed may be released, and by means of which a check key or a deposit key may be released after it has been depressed, following an overdraft.
Fig. 9 is a side elevation of a part of the transaction bank, showing the switch mechanism associated with this particular bank, to be closed upon depression of any one of the keys in this bank except the overdraft key.
Fig. 10 shows a portion of the machine-releasing mechanism, the tripping mechanism for said machine-releasing mechanism, and the electrical means which operates said tripping mechanism.
Fig. 11 is a detail of the mechanism which is operated by either the check key or the deposit key in combination with the depression of the overdraft key after an automatic overdraft lock has taken place, to release the machine for operation.

Fig. 10 shows the machine release mechanism, including the usual release shaft 30, a part of the mechanism for rocking it counter-clockwise to release the machine, the machine release shaft tripping mechanism, and the electrical device which operates said machine release shaft tripping mechanism.

The means for restoring the shaft 30 to its normal position is not shown herein, but it is identical with that which is fully illustrated and described in the above-mentioned Shipley Patent No. 1,619,796, and, if a description thereof is desired, reference may be had to that patent for the same.

The machine release shaft 30 (Fig. 10) is adapted to be moved counter-clockwise by a strong spring 31, mounted in a slot 32 of a link 33, in exactly the same manner as fully illustrated and described in the above-mentioned Shipley Patent No. 1,619,796. The spring sits on a finger 34 of the link 33 and also engages fingers 35 of arms 36 (only one arm being shown), which are mounted on each side of the link 33. A stud 37, carried by the arms 36, projects into an arm 38, which is secured to the machine release shaft 30. Also secured to the machine release shaft 30 is an arm 39, carrying a flat-sided pin 40.

The shaft 30 is held in its normal position by the upper end of a trip lever 41, engaged by the flattened pin 40 and held in such engagement by the spring 31. This trip lever 41 is pivoted on stud 42, carried by the machine side frame 20.

The trip lever 41 carries a stud 43, by means of which said trip lever is connected to a link 44, which in turn is connected by means of a long stud 45 to a solenoid core 46 of a solenoid 47, mounted on a bracket 48, secured to the side frame 20. A spring 49, connected to the link 44 and to a bracket 50, secured to the machine side frame, normally maintains the parts in the positions shown in Fig. 10, where the upper end of the trip lever 41 is beneath the flat stud 40 of the arm 39, which is secured to the machine release shaft 30. A finger 51 on the lower end of the trip lever 41 is normally held, by the spring 49, in contact with a resilient sound-deadening block 52, of rubber or similar material, secured to the bracket 50.

By means to be described hereinafter, the solenoid core 46 is moved to the left, as viewed in Fig. 10, in the direction of the arrow, thus pulling the link 44 in the same direction, which rocks the trip lever 41 clockwise, moving its upper end from beneath the flattened pin 40, whereupon the strong spring 31, through the medium of the stud 37 and the arm 38, rocks the machine release shaft 30 counterclockwise until a surface 53 of the arm 38 contacts a limiting pin 54, carried by the side frame 20.

Such movement of the machine release shaft 30, as has been clearly illustrated and described in the above-mentioned Shipley Patent No. 1,619,796, closes a circuit through the machine motor, thus driving the machine through a normal cycle of operation.

The solenoid 47 is energized upon the closing of certain microswitches, which will be hereinafter described in connection with the particular part of the control of the operation of the release of the machine by certain of the control keys.

In order to prevent an operator from accidentally or intentionally holding down any one of the operating keys—that is, keys which when depressed cause the machine to be released and to be driven through an operation of the machine—thus causing an immediate second operation of the machine, there is provided a usual non-repeat pawl 56, pivoted on the stud 42 and having a stud 57 held in contact with a surface 58 of the trip lever 41 by a spring 59.

The pawl 56 is slightly higher than the upper end of the trip lever 41, and consequently, when the pin 40 is released by the lever 41 and moved downwardly under the tension of the spring 31, it is moved downwardly to the left of the trip lever 41, and to the right of the non-repeat pawl 56, thus holding the lever 41 in its released position at the end of the operation of the machine, until after the arm 39 is restored clockwise to a position slightly above that shown and then finally restored to the position shown in Fig. 10.

At this time, the arm 39 is slightly above the position shown, and the circuit through the solenoid 47 is broken; consequently, the spring 49 can restore the solenoid core 46 and the link 44 to the right, to the position shown, thus moving the trip lever 41 to the position shown, so that, when the arm 39 finally assumes the position shown, the flattened pin 40 will be directly above the upper end of the trip lever 41.

*Keyboard*

The keyboard of the machine is diagrammatically shown in Fig. 1, and, since this keyboard has been fully described in detail in the above-mentioned Spurlino et al. Patent No. 2,373,510, it will be only briefly described herein.

The two left-hand banks of keys 150 are used for setting up the days of the month to be printed on the combined statement and ledger card. The year and the month are set up by two levers, which are not shown in this application.

The next four rows of keys 151 are used for setting up the number of checks in any given bundle of checks.

The next ten rows of amount keys 152 are used for setting up amounts, for pick-ups of balances, the amounts of checks and deposits, and any other desired information used in connection with the banking business.

The keys 153 in the next or symbol row are used as print keys only, to control the setting of symbols to be printed on the combined statement-ledger sheet.

The keys 154 to 162 inclusive, of row one, will now be described.

The Overdraft Pick-Up key 154 is used when the account balance to be picked up is an overdraft or debit balance. Amounts entered through this key will add on the subtract side of the crossfooter or totalizer on the upper totalizer line.

The Deposit Correction key 155 is used to correct any deposit which might have been entered incorrectly.

The Analysis key 156 is used when it is desired to indicate any information in connection with any deposit which contains checks which are to be collected from other banks.

The deposit key 157 is used when deposits or credits are posted to any and all accounts. Amounts entered through this key will add into the plus side of the balance totalizer on the upper line, as shown by the chart in Fig. 4, and will also add into the plus side of the deposit crossfooter, which is on the back totalizer line.

The Overdraft key 158 is used to unlock the overdraft lock or, in other words, to set up a condition whereby the machine may be released when there is an overdraft in the balance totalizer or crossfooter, when said Overdraft key is depressed in connection with the Deposit key or the Check key of the transaction bank. This key 158 is also depressed in conjunction with the Indicator Balance key when there is an overdraft in the machine, in order to indicate how much that overdraft is.

As will be hereinafter described in detail, the depression of this Overdraft key 158 is used to prevent the actual locking of the machine when an overdraft has occurred. In other words, in connection with the present invention, this feature is to particularly cause the machine to be locked up when an overdraft has been made in the crossfooter, upon an attempted subsequent operation by the depression of either the Check key, the Deposit key, and the three lower keys and the top key of the total row bank.

In other words, the amount of a check cannot be deducted from the crossfooter, once an overdraft has occurred, without the operator's being notified that the machine stands in an overdraft condition, and therefore, a deposit cannot also be made to bring the totalizer back to a positive condition without the operator's being notified that the machine has an overdraft in it and that that particular customer's account is overdrawn.

The Check key 159 is used to post all checks or debits to any and all accounts. Amounts posted through this key are automatically subtracted from the crossfooter on the upper or No. 1 line because the minus side of this crossfooter is selected by this Check key. Amounts posted through this Check key 159 are added into the plus side of the check totalizer, a crossfooter, located on the back or No. 2 line, since said plus side of the check totalizer is selected to have added thereinto the amounts of the checks as they are listed.

The Space key 160 is used to space the combined statement-ledger for any purpose other than a regular posting operation.

The Check Correction key 161 is used to correct or take out a check which has been posted incorrectly, or posted to the wrong account. Amounts added or entered through this key will be added into the balance totalizer on line No. 1 and will be subtracted from the check add-subtract totalizer on line No. 2.

The Balance Pick-Up key 162 is used in the normal operations of the machine to pick up the old balance from the combined statement-ledger sheet prior to posting operations, and this key, when so used, selects the plus side of the balance totalizer, so that, as the posting continues by the entry of checks and deposits, a final new balance may be taken from this upper crossfooter on line No. 1.

The keys 163 to 168 inclusive of the total row are used for total operations or sub-total operations.

The New Balance key 163 is used to extend the new balance after all items have been posted. However, if this new balance should be an overdraft, the machine will not be released, when the New Balance key is depressed, until the Overdraft key 158 has been first depressed.

The Sub-Balance key 164 is used to print the balance without clearing it from the crossfooter.

Figure 2:
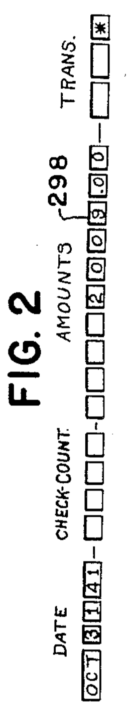
Fig. 2 is a diagrammatic view of the indicator, showing the date, the number of checks, and the amounts and types of transactions.

The Indicate Balance key 165 is used to "set" the indicator of Fig. 2 to indicate the balance standing on the crossfooter after items have been posted.

The Sub-Total Row No. 1 key 166 is used with the Overdraft Pick-Up key 154, the Deposit key 157, the Check key 159, and the Balance Pick-Up key 162, to read or take a sub-total of the accumulations which are on the corresponding totalizer on the back or No. 2 totalizer line.

The Clear Row 1 key 167 is used in combination with the keys in row 1 to take totals from their respective totalizers.

Below the keys 163 to 168 of the total row there is the word "add" surrounded by a dotted circle. This represents the zero position of the total row, and the differential mechanism associated with these keys will stop in this position on all add operations. This is fully shown and described in the above-mentioned Goldberg Patent No. 2,175,346.

*Transaction key bank*

Figures 4, 5, 6:
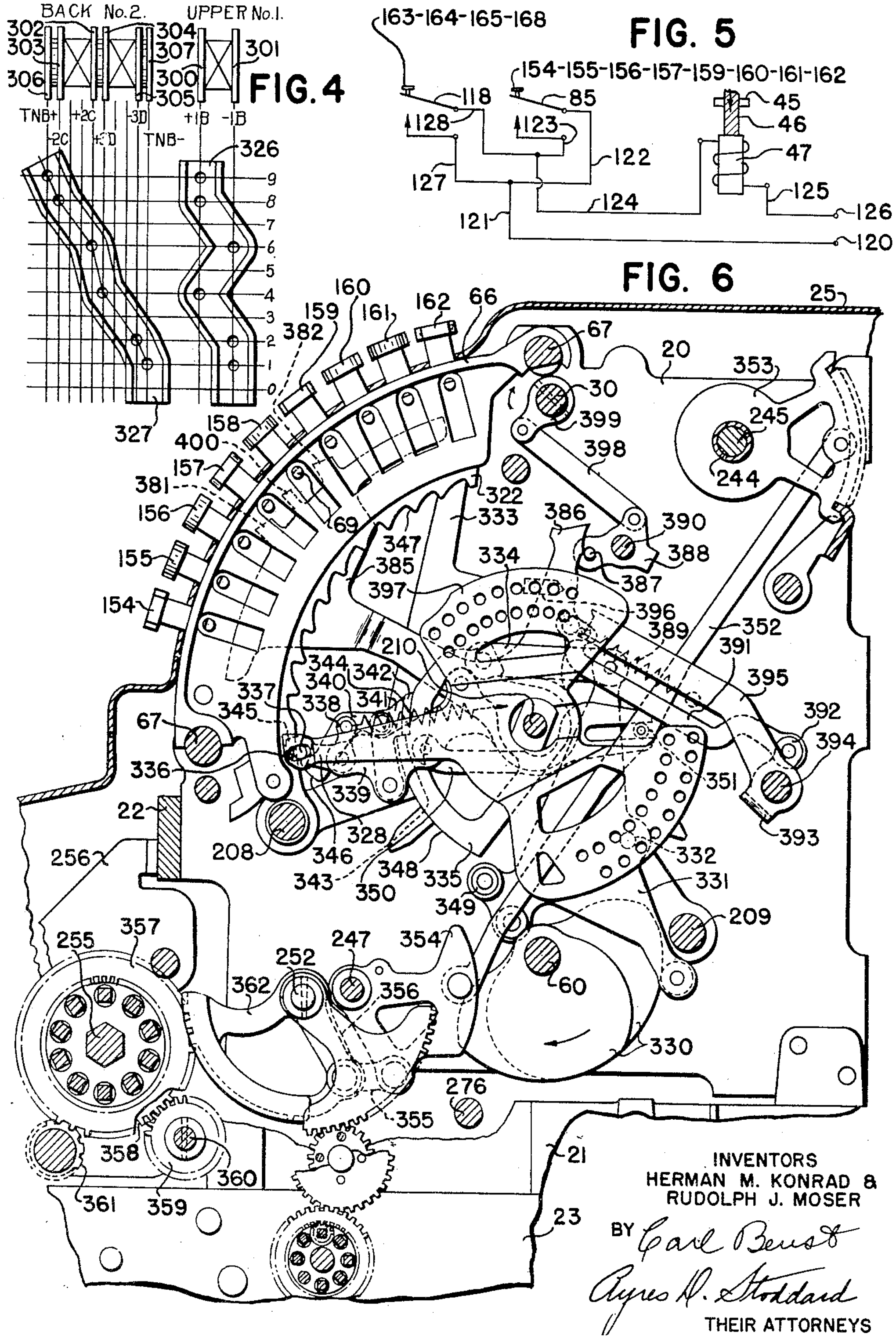
Fig. 4 is a diagrammatic view of the totalizers and the totalizer-selecting cams.
Fig. 5 is a wiring diagram showing the circuits through the electrical means which operates the machine release tripping mechanism, and through the switches which are operated by the keys.
Fig. 6 is a section of the machine taken to the right of the first transaction bank of keys, looking toward the left of the machine.

The transaction key bank is shown in Fig. 6, looking from the right of the machine, and a portion of the same bank is shown in Fig. 9, looking from the left side of the machine.

Each key of this transaction bank of keys, carries a pin 61 (Fig. 9), each pin except the one on the Overdraft key 158 is adapted to cooperate with an associated slot 62 of a releasing bar 63, pivoted at its upper end to an arm 64, pivoted at 65 on a key frame 66, and pivoted at its lower end to an arm (not shown). The frame 66 is mounted on the usual rods 67, carried by the machine side frames 20.

Associated with each of the transaction keys is a coil spring 68 (Fig. 9), which is adapted to hold the keys in their normal undepressed positions, in a manner which is well known in the art.

Each of the transaction keys carries on its opposite side—that is, on the side opposite the pin 61—a flattened pin 69 (Fig. 17), which cooperates with an angular nose 70 of a retaining detent 71, mounted on arms 88 (only one of which is shown) carried by the frame 66 in the usual manner, as shown in the previously-mentioned application of Spurlino et al., Serial No. 87,026, and the Shipley Patent No. 1,682,197. A spring 72 normally retains the angular sides of the noses 70 against the pins 69.

When one of the keys is moved into its depressed position, the pin 69 moves the detent 71 downwardly until the pin passes a shoulder 73 on the bottom of the nose 70, whereupon the spring 72 immediately moves the detent 71 upwardly again, thus latching the key in the depressed position.

When any one of the transaction keys except the overdraft key is moved into its depressed position and latched in that position, the arm 64 (Fig. 9), by means of a pin 74 carried thereby and contacting a finger 75 on arm 76, pivoted on a rod 77, rocks the arm 76 clockwise, as viewed in Fig. 9. The arm 76 also has an integral arm 78 having a pin 79 connected to a link 80 pivoted at 81 to an arm 82 pivoted on the machine release shaft 30.

The arm 82 has a bent-over lip 83 (Fig. 9) adapted to cooperate with a switch plunger 84, which operates a microswitch 85 on a bracket 86 carried by the machine frame.

When the transaction keys are in their normal undepressed positions, there is a clearance, indicated at 87, between the lip 83 and the end of the switch-operating plunger 84.

Upon depression of any one of the transaction keys, except the Overdraft key 158, the associated pin 61 of any depressed key moves the bar 63 downwardly, whereupon the arm 64 is rocked counter-clockwise (Fig. 9), and the pin 74 rocks the arm 76 clockwise. This causes the link 80 to raise and rock the arm 82 clockwise. While this is occurring, the pin 69 (Fig. 17) is moving the detent 71 downwardly against the tension of the spring 72, and, just as soon as the flattened part of the pin 69 passes beneath the nose 70 and gets beneath the shoulder 73, the spring 72 moves the detent 71 upwardly again, thus retaining the depressed transaction key in its depressed position.

The relations of the parts—that is, the shoulders 73—to the clearance 87 are such that the detent 71 latches the transaction key in its depressed position just as the lip 83 touches the end of the switch-actuating plunger 84. At this time, the key is further depressed, whereupon the arm 82 is rocked still farther clockwise to move the switch plunger upwardly a distance sufficient to close the contacts of this switch 85, which are normally in an open condition. Spring 68 returns the transaction key slightly upwardly until the flattened pin 69 contacts the shoulder 73, which retains the key in its depressed position.

When this switch 85 is closed, it completes a circuit through a solenoid, to be described hereinafter, which has for its purpose the function of operating the machine release tripping mechanism, which has been described previously, so that, just as soon as one of the transaction keys, except the Overdraft key, is completely depressed, the machine-releasing mechanism is released and can function to cause the machine to go through the normal cycle of operation.

*Total control bank*

The total control key bank and its associated mechanism and connections, whereby it controls or operates a microswitch to in turn control the solenoid release of the machine release shaft, will now be described.

As previously stated, there are in this control bank six control keys 163 to 168 inclusive (Figs. 1 and 14), which are slidably mounted in a key frame, which is not shown herein but which is similar to the key frame 66 for the transaction bank of keys and is mounted on the previously-described rods 67. Each of the keys has a flattened stud 90, cooperating with the angular face of a nose 91 (Fig. 19) on a retaining detent 92, slidably mounted on pins 93, carried by the total key frame (not shown). The angular faces of the noses 90 are normally held in contact with pins 90 by a spring 94, connected to a pin 95 on the detent 92 and a pin 96 mounted in the key frame (not shown).

When any of the keys 163 to 168 is depressed, its pin 90 moves the detent 92 upwardly, as viewed in Fig. 19, until the flattened portion of the pin is below a surface 97 of the nose 90, whereupon the spring 94 again moves the detent back to the position shown in Fig. 19, thus retaining the depressed key in its depressed position.

The pins 90 of the keys 163, 164, 165, and 168 cooperate with angular slots 100, and the pins 90 of the keys 166 and 167 cooperate with a straight-sided slot 101 of an operating bar 102, slidably mounted on pins 103, supported by the key frame (not shown). A spring 104 normally holds the left side of the slots 100 against the pins 90 of the keys 163, 164, 165, and 168. All of the keys 163 to 168 inclusive are maintained in their normal positions by a compression spring 105 (one of which is shown associated with one key). These springs function in the normal way, which is well known in the art.

The operating bar 102 carries a pin 110, engaged by a forked arm 111, pivoted on the rod 77. Connected to the arm 111 by means of a hub 112 is an arm 113, which is connected by a link 114 to an arm 115, pivoted on the machine release shaft 30. The arm 115 has a formed-over lip 116 adapted to cooperate with a plunger 117, which operates contacts of a microswitch 118, in a manner to be described hereinafter.

When any one of the keys 163, 164, 165, or 168 is depressed, its downward movement causes its pin 90 to move the control bar 102 downwardly, thus rocking the arm 111 and also the arm 113 counter-clockwise, whereupon the link 114 rocks the arm 115 counter-clockwise and causes the lip 116 to engage the plunger 117 and move it upwardly to close the contacts of the microswitch 118, the purpose of which will be described hereinafter.

Whenever one of the keys 166 or 167 is depressed, due to the fact that the pins 90 of these keys cooperate with the straight-sided slot 101, the depression of either of these keys, consequently, does not move the bar 102, and consequently the microswitch plunger 117 is not operated.

This microswitch is in circuit with an electrical device, to be described later, which is for the purpose of operating the machine release shaft tripping means.

The clearance 119 (Fig. 14), between the lip 116 and the end of the plunger 117, is sufficient to permit the depressed key, 163 to 165 and 168, to have its stud 90 below the shoulder 97 of the nose 91 of the retaining detent 92, so that the key will be positively locked in its depressed position before the plunger 117 is moved inwardly a distance sufficient to close the contacts of the microswitch 118 in identically the same manner as was described in connection with the lip 83 and the plunger 84, associated with the bank of transaction keys 154 to 162 inclusive.

*Circuits*

The circuits for energizing the solenoid 47 under control of the keys 154 to 162 inclusive and 163, 164, 165, and 168 are shown in Fig. 5.

When any one of the keys 154 to 162 inclusive is depressed and latched in its depressed position, in the manner described above, it operates the plunger 84, which closes the circuit through the microswitch 85, thus completing a circuit as follows:

From one side 120 of the source of supply, through line 121, line 122, closed microswitch 85, line 123 to line 124, through the solenoid 47, line 125 to the opposite side of the line at point 126, thus energizing the solenoid 47, whereupon the core 46 is moved to the left as viewed in Fig. 10, for the purposes described above.

When any one of the keys 163, 164, 165, or 168 is depressed, it, in the manner described above, operates the plunger 117 (Figs. 5 and 14) to close the circuit in the microswitch 118, thus completing a circuit as follows:

From the point 120 of the supply, through line 121, line 127, closed microswitch 118, line 128, thence through line 124, through the solenoid 47, through line 125, to the point 126 on the opposite side of the line, thus energizing the solenoid 47, whereupon its core 46 is moved to the left, as viewed in Fig. 10, to cause the tripping of the machine release shaft in the manner previously described.

*Amount banks and amount differentials*

The ten banks of amount keys and their associated differential mechanisms are alike in every respect and are similar in construction to those shown in the patents to Shipley and Goldberg, hereinbefore referred to. Since all amount banks are alike, a description of one of the amount banks and the differential associated therewith will be sufficient.

The amount keys 152 are mounted in a key frame 200, supported by the rods 67, extending between the machine side frames 20. Depression of any one of the amount keys 152 rocks a zero stop pawl 203 associated with that particular denomination counter-clockwise out of the path of a reset spider 204, free on a hub of an amount differential actuator 205, rotatably supported on a bushing 206, extending between two similar support plates 207 (only one shown). These plates in turn are supported by rods 208 and 209, extending between the side frames 20. There is a pair of supporting plates 207 for each amount differential, and a tie rod 210 extends through holes in the center of the bushings 206, to secure all the amount differentials in a compact unit.

A notch in the forward end of the spider 204 engages a stud 211 in the forward end of a bell crank 212, pivoted on an extension of the actuator 205. Carried by the vertical arm of the bell crank 212 is a stud 213, on which is pivoted an arm 214. The arm 214 is also pivoted on the upper end of a latch 215, pivotally mounted on the actuator 205. The latch 215 has a foot 216, normally held in contact with the periphery of a driving segment 217, just above a shoulder 218 thereon, by a spring 219. The driving segment 217 is rotatably supported on the hub of the actuator 205. A link 220 pivotally connects the driving segment 217 to a cam lever 221, pivoted on a stud 222 in the left-hand one of the plates 207, said lever 221 carrying rollers 223 and 224, which coact with the peripheries of cams 225 and 226, respectively, secured on the main shaft 60. Depression of any one of the amount keys 152 moves its lower end into the path of a rounded surface 227 of an extension of the forward arm of the bell crank 212.

In adding operations, the main shaft 60 and the cams 225 and 226 make one clockwise revolution, causing the lever 221 to rock the driving segment 217 first clockwise and then counter-clockwise back to normal position. Clockwise movement of the segment 217 causes the shoulder thereon, in cooperation with the foot 216 of the latch 215, to carry the latter and the amount actuator 205 clockwise in unison, until the rounded surface 227 contacts the stem of the depressed amount key 152. This rocks the bell crank 212 and, through the arm 214, the latch 215 counter-clockwise to disengage the foot 216 of the latch from the shoulder 218 to arrest the clockwise movement of the actuator 205, and to position said actuator according to the value of the depressed amount key 152. Disengagement of the latch 215 moves a rounded extension 233 of the arm 214 into engagement with the corresponding one of a series of locating notches 234 in a plate 235, secured between the rod 208 and an upward extension of the left-hand support plate 207.

After the latch 215 is disengaged from the shoulder 218, an arcuate surface 236 on the segment 217 moves opposite the foot 216 to retain the latch in its set position.

When the lever 221 reaches the terminus of its clockwise movement, a roller 237, carried thereby, coacts with an arcuate surface 238 on a beam 239, pivoted on a stud 240 in the actuator 205, and forces a concave surface of the upper edge of said beam into contact with the hub of the actuator 205 to move the rear end of said beam into a position commensurate with the value of the depressed amount key.

The rear end of the beam 239 engages a stud 241 in a link 242, the upper end of which is pivoted to a segment 243, mounted on one of a series of nested tubes 244, supported by a shaft 245, journaled in the main side frames 20. The lower end of the link 242 is pivotally connected to a segmental arm 246, free on a shaft 247, journaled in the side frames 20. The arm 246 carries a stud 248, which engages a camming slot in a zero elimination cam plate 249, pivotally mounted on a stud 250 in a segmental gear 251, free on a shaft 252, journaled in the side frames 20. The teeth of the segmental gear 251 mesh with external teeth of an external-internal ring gear 253, having internal teeth which, in cooperation with the periphery of a disk 254, fixed on a shaft 255, form a rotatable support for said gear 253. The shaft 255 is supported by brackets 256, secured to the cross bar 22 and the main framework of the machine. The internal teeth of the ring gear 253 mesh with a pinion 258, rotatably supported in a boring in the disk 254. The pinions 258 and the square shaft 259 in turn drive other pinions similar to the pinions 258, which mesh with internal teeth of gears similar to the gear 253, the external teeth of which gears mesh with and drive corresponding denominational type wheels 260 in each row of the column-printing mechanism.

Figure 20:
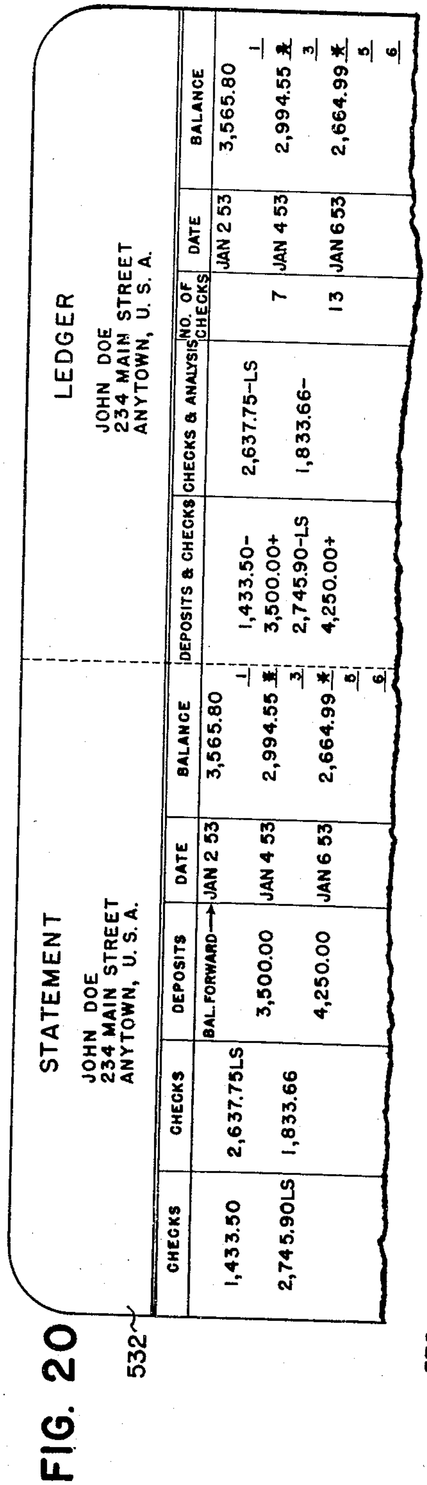
Fig. 20 is a facsimile of a combined statement and ledger sheet which is printed by the machine embodying the present invention, with the printing of all overdrafts omitted.
Figure 21:
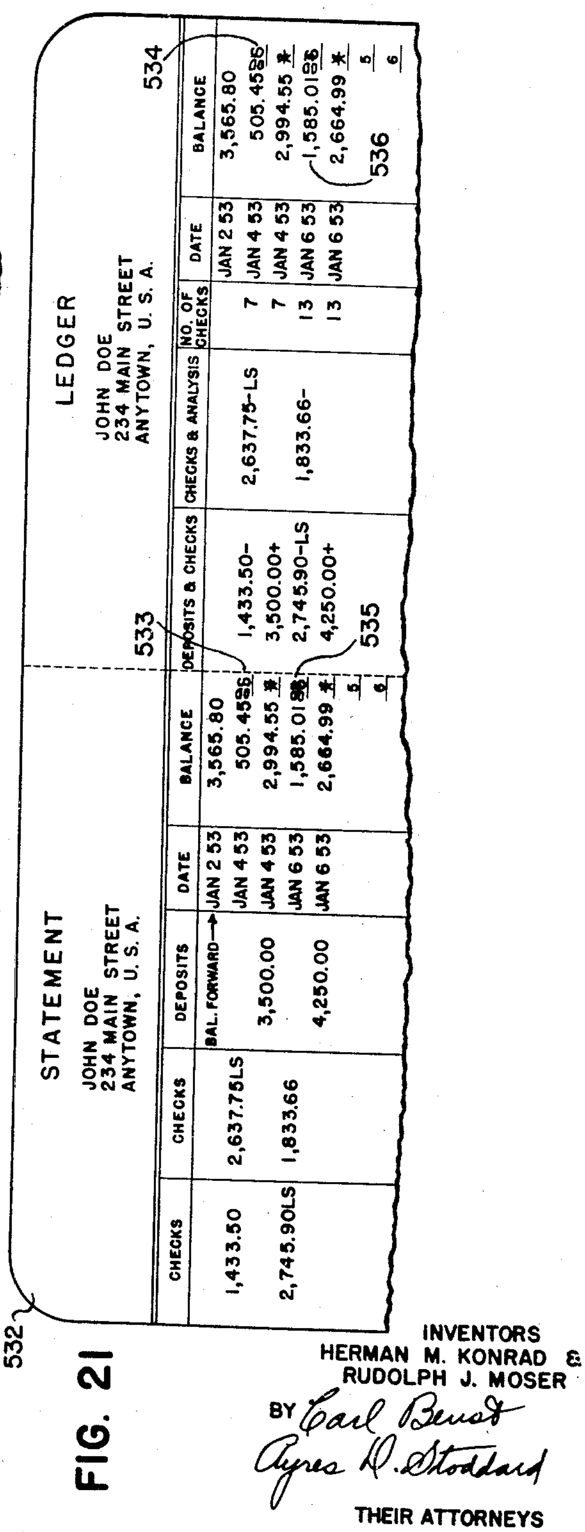
Fig. 21 is a facsimile of a combined statement-ledger sheet printed from a machine embodying the present invention, and shows that the banking rules in which that machine is used wish to have the overdraft printed, which can be done immediately the overdraft occurs, before any further posting of either checks or deposits is done.

The column-printing mechanism in this case is adapted to print the same data simultaneously on a combined statement-ledger sheet, as shown in Figs. 20 and 21, and also on a journal sheet, as particularly illustrated and described in the above-mentioned Spurlino et al. Patent No. 2,373,510.

The method of driving the type wheels of the present column-printing mechanism is fully explained in the previously-mentioned Arnold Patent No. 2,141,332 and embodies an application of the well-known principle of driving mechanism disclosed in the above-mentioned Kreider Patent No. 1,693,279.

For the purpose of properly alining the differential mechanism and the type wheels set thereby, there is provided on each of the segments 243 a series of notches 271, engaged by an aliner 272, secured to a shaft 273, journaled in the machine side frames 20.

The aliner 272 is disengaged from the notches 271 during the differential setting of the type wheels, and, after they have been set under control of the amount keys 152, through the differential mechanism, the aliner 272 is again moved into engagement with the notches 271 to aline the type wheels during printing.

The plate 249 (Fig. 3) carries a stud 274, which is engaged by a notch formed in the end of a zero elimination operating slide 275, having parallel slots which engage, respectively, a shaft 276, journaled in brackets 277, secured to the base 21, and a rod 278, supported by arms 279 (only one of which is shown), secured on the shaft 276. A spring 280, tensioned between the arm 246 and the plate 249, normally maintains the lower end of the cam slot in said plate 249 in engagement with the stud 248, as shown here.

Inasmuch as the zero elimination mechanism shown here is similar to and functions precisely like the zero elimination mechanism disclosed in the United States Patent No. 2,141,333, issued December 27, 1938, to Charles H. Arnold, it is believed that a brief description of this mechanism, as shown in Fig. 3, will be sufficient.

The zero elimination slide 275 carries a roller 281, which cooperates with an arcuate surface 282 on a slide-operating arm 283, free on a shaft 285, journaled in the brackets 277. The arm 283 is connected by a hub, free on the shaft 284, to a companion arm 285, which cooperates with a stud 286 in the arm 283 for the next lower denomination. Likewise, the arm 283 for the denomination being described carries a stud 286, which cooperates with the arm 285 for the next higher denomination, and so on. The stud 286 in the arm 283 for the highest denomination cooperates with an arm similar to the arm 285, which is secured to the shaft 284, and said shaft is rocked first clockwise near the beginning of the machine operation and then back to normal position in the same manner as shown in Fig. 5 of the Arnold patent last referred to. Clockwise movement of the shaft 284 and the arm 285 for the highest denomination is transmitted through the stud 286 to the arm 285 for said highest denomination, and on down the line through all the denominations, to rock the arm 283, shown here, first clockwise to shift the slide 275 rearwardly to disengage the notch in said slide from the stud 274 in the cam plate 249.

Assuming, for example, that a key has been depressed in the amount bank shown in Fig. 3, after the slide 275 therefor has been shifted rearwardly out of engagement with the stud 274, and after the actuator 205 has been positioned under the influence of the depressed key 152, the roller 237 engages the arcuate surface 238 to position the beam 239, the link 242, and the segments 243 and 246 commensurate with the value of the depressed amount key. Prior to the positioning of the segment 243, as explained above, the aliner 272 is rocked clockwise and disengaged from the notches 271 in the segment 243, and, after said segment is positioned under the influence of the beam 239, the aliner is again engaged with the notches 271 to secure the segments 243 and 246 against displacement.

The positioning of the segment 246 moves an arcuate surface 291 thereon into the path of a roller 292, carried by the arm 283 for this particular denomination. Consequently, forward return movement of the slide 275 under the influence of the spring 293 is obstructed, and the slide is retained in its rearward position. The stud 286 in the arm 283 for the denomination shown in Fig. 3 obstructs counter-clockwise return movement of the arm 283 for the next lower denomination, and so on, down the line, to hold the slides 275 for all lower denominations in their rearward positions to retain notches in said slides out of engagement with the studs 274, so that no movement will be imparted to the cam plate 249 when the shaft 276 and the arms 279 are rocked counter-clockwise back to normal position after the segments 246 have been positioned under the influence of the depressed amount keys.

When no key 152 is depressed in the amount bank shown in Fig. 3, or in any of the higher order amount banks, the segment 246 is positioned to zero, as shown herein, in which position a clearance portion of said segment is opposite the roller 292. This permits forward return movement of the arm 283 and the slide 275 under the influence of the spring 293, to cause the notch in the end of the slide to reengage the stud 274. After the notch in the slide has been reengaged with the stud 274, counter-clockwise movement is imparted to the shaft 276, the arm 279, and the slide 275 by mechanism similar to that shown in Fig. 4 of the Arnold Patent No. 2,141,333. Counter-clockwise movement of the slide 275 rocks the zero elimination cam plate 249 clockwise, causing the cam slot therein, in cooperation with the stud 248, which is held stationary at this time, to rock the segment 251 counter-clockwise against the action of the spring 280 to move the ring gear 253 clockwise from zero position, as shown here, to one position beyond zero, which in this case is a blank or non-printing position.

Clockwise movement of the ring gear 253, through the pinion 258, the shaft 259, and other pinions and ring gears (similar to the pinions 258 and gears 253, respectively) for this particular denomination, moves the type wheels 260 counter-clockwise from zero positions to non-printing positions, so that the zeros will not be in position to print. Obviously, zero printing will be eliminated in a like manner in all higher denominations. In other words, the zero elimination mechanism functions, for example, when a key 152 is depressed only in the fourth amount bank, to cause zeros to print in the three lower denominations and to eliminate the printing of zeros in higher denominations.

After the amount differential actuator 205 (Fig. 3) has been positioned under the influence of the depressed amount key 152, the wheels of the selected totalizer are engaged with the corresponding one of two sets of teeth 294 and 295 thereon, after which return movement of the cam lever 221 and the segment 217 causes the arcuate surface 236 on the segment to move beyond the sole of the foot 216 on the latch 215, to permit said latch, under the influence of the spring 219, to drop behind the shoulder 218 and disengage the nose 233 from the notch 234 in the plate 235. At the same time, a surface on the inner side of the segment 217 engages a stud 296, carried by the actuator 205, and returns said actuator counter-clockwise, in unison with the segment, to zero position. This counter-clockwise return movement of the actuator 205 rotates the wheels of the engaged totalizer or totalizers an extent commensurate with the value of the depressed amount key 152 to add or subtract in said totalizer or totalizers the amount represented by the depresed amount key.

If no amount key 152 is depressed, the zero stop pawl 203 (Fig. 3) remains in the path of the spider 204, and, therefore, upon initial movement of said spider and the actuator 205, the zero stop pawl is engaged by an extension of said spider and disengages the latch 215 from the driver in zero position, after which the roller 237, cooperating with the beam 239, positions the segments 243 and 246 and associated mechanism in proportion thereto to position the type wheels 260, for this particular amount bank, in zero position.

At the end of any type of operation, the actuator 205 (Fig. 3) is always returned to home position, as shown here. However, the link 242 and the segments 243 and 246, as well as the printing mechanism controlled thereby, remain in their set positions at the end of machine operations and are moved directly from said set positions to their new positions in the succeeding machine operation.

The usual transfer mechanism is provided for transferring digits from lower denominations to higher denominations in adding and subtracting operations.

*Indicators*

The ring gears 253, driven from the main differentials, and other ring gears, to be described later, which are driven under the control of the transaction keys, operate gears 297, to which are secured indicators 298 (Fig. 2), so that each transaction is visibly displayed to the operator as it is entered into the machine.

*Totalizers*

As previously explained, the machine embodying this invention has two lines of totalizers, including an upper or No. 1 totalizer line, and a back or No. 2 totalizer line. The No. 1 totalizer is a balance totalizer, often referred to as a crossfooter, and comprises denominational sets of plus wheels 300 (Figs. 3 and 4) and denominational sets of minus wheels 301, said plus and minus wheels of each denominational order being reversely geared together, so that, when one wheel is turned in one direction, the other turns in the opposite direction, and vice versa.

The No. 2 or back totalizer line (Figs. 3 and 4) has thereon two add-subtract totalizers, one for storing the amounts represented by the value of the checks and the other for storing the totals of the deposits, the add-subtract feature being necessary in each case for check and deposit corrections in the case of errors.

The add-subtract totalizer for the storing of check totals comprises adding wheels 302 and subtracting wheels 303 (Fig. 4), which are geared together for reverse movement in exactly the same manner as the No. 1 or balance totalizer wheels, explained above. It should be noted that, in the "Check" totalizer, the relative positions of the "Add" and "Subtract" totalizer wheels 302 and 303 are the reverse of those usually shown in this form of totalizer.

This is an expedient employed in the present machine to effect adding into the "Check" totalizer when subtracting from the balance totalizer on the No. 1 line, and to subtract from the "Check" totalizer when adding into the balance totalizer on the No. 1 line to make corrections.

The deposit totalizer comprises adding wheels 304 and subtract wheels 305, which likewise are geared together for reverse movement. In addition to the two adding and subtracting totalizers, the No. 2 totalizer line includes a set of adding wheels 306 for the storing of the positive totals of the new balances and a set of adding wheels 307 for the negative totals of the new balances.

In new balance operations, if a balance totalizer contains a plus amount, the plus side of said balance totalizer (wheels 300) will be reset, and the amount thereon will be simultaneously transferred to the wheels 306. On the other hand, if the balance totalizer contains a negative amount, its minus side (wheels 301) will be reset, and the amount thereon will be transferred to the wheels 307 of the No. 2 totalizer line.

The No. 1 totalizer line and the No. 2 totalizer line are mounted in shiftable frameworks 308 and 309, respectively (Fig. 3), of the type shown and described in the above-mentioned Shipley and Goldberg patents.

The means for engaging the No. 1 totalizer line and the No. 2 totalizer line with and disengaging them from the amount actuators 205 is also fully shown and described in the above-mentioned Shipley and Goldberg patents, as well as in the previously-mentioned patent to Spurlino et al. No. 2,375,594.

*Transfer total mechanism*

Inasmuch as it is desirable to transfer amounts from the balance totalizer to a selected one of the two adding totalizers on the No. 2 line in new balance operations, special means is provided to control the engaging and disengaging movement of the No. 2 totalizer line. Such mechanism is fully illustrated in the above-mentioned Spurlino et al. Patent No. 2,375,594, to which reference is hereby made for a complete understanding of this particular mechanism.

The lateral shifting of the No. 1 or balance totalizer to select the plus or the minus side thereof for engagement with the amount actuators is controlled by a shifting cam 326, shown diagrammatically in Fig. 4, and the lateral shifting of the No. 2 totalizer line to select the plus side or the minus side of the two add-subtract totalizers thereon, as well as the two adding totalizers thereon, is controlled by a shifting cam 327, also shown diagrammatically in Fig. 4. The two shifting cams 326 and 327 are secured in fixed relationship to each other, and the positioning of the two shifting cams is controlled by the transaction keys 154 to 162 inclusive (Figs. 1 and 6).

*First transaction bank differential mechanism*

The manner in which the cams 326 and 327 (Fig. 4) are positioned by the differential mechanism associated with the transaction keys is disclosed in the Shipley and Goldberg patents hereinbefore referred to. Therefore, it is believed that a brief description of this mechanism, in conjunction with Fig. 6, will be sufficient for the purpose of this specification.

All of the transaction keys except the Overdraft key 158 operate the microswitch 85 (Figs. 5 and 9) to in turn control the circuits which cause an operation of the machine release shaft solenoid 47, as shown in Fig. 10.

This Overdraft key 158 is operated in conjunction with the Check key 159 under certain circumstances, and is also operated in conjunction with the Deposit key 157 in certain other conditions. It may also be operated in conjunction with the indicator balance key 165.

The operation of this Overdraft key 158 takes place only during the case when there is an overdraft in the machine.

As previously stated, when an overdraft occurs, the machine, upon an attempted subsequent operation for the entry of a check or a deposit, is automatically locked against operation, to prevent the operator from entering a deposit to cover up or clear out an overdraft when one has occurred, without such overdraft's being noted by the bank on the customer's statement-ledger sheet. This mechanism will be later described in detail.

All of the transaction keys control the positioning of the transaction differential mechanism shown in Fig. 6. However, only the Deposit key 157, the Deposit Correction key 155, the Check key 159, and the Check Correction key 161 are effective in check posting operations to select the corresponding sides of the two add-subtract totalizers on the No. 2 totalizer line. As explained previously, the two adding totalizers (wheels 306 and 307) on the No. 2 totalizer line, for storing the total new balance, plus and minus, are not engaged with the amount actuators in check posting operations, but are engaged therewith only in new balance operations to store the amount of the new balance.

The transaction differential mechanism, controlled by the transaction keys, in addition to selecting the totalizers on the No. 2 line corresponding to said keys and selecting the proper side of the balance totalizer for engagement with the amount actuators, also controls the positioning of the type wheels for recording characters representative of the type of operation being performed adjacent the amount recorded.

Depression of any one of the transaction keys, except the Overdraft key 158, will project its lower end into the path of movement of means associated with the differential latch 341 to disengage said latch in a position corresponding to the position of the key. This means, as well as the mechanism associated therewith, will now be described.

The drive shaft 60 carries a pair of cams 330, which coact with rollers on a Y-shaped lever 331 pivoted on a stud 332 mounted in the left-hand one of a pair of plates 333 (only one of which is shown) supported by the rods 208 and 209. The lever 331 is connected by a link 334 to a driving segment 335, rotatably mounted in an old and well-known manner.

The forward end of an arm 328 has a slot 336, through which projects a stud 337 in the forward extension of a bell crank 338 pivoted on a differentially-adjustable arm 339 freely mounted on the rod 210. Pivotally mounted on the vertical arm of the bell crank 338 is an arm 340, which is also pivoted to the upper end of the latch 341, pivoted on the differentially-adjustable arm 339. The latch 341 has a foot 342, normally held in contact with the periphery of the driving segment 335, just above a shoulder 343, by means of a spring 344. In adding operations, the main shaft 60 and the cams 330 make one clockwise rotation, causing the lever 331 to rock the driving segment 335 first clockwise and then counter-clockwise back to normal position. Clockwise movement of the segment 335 causes the shoulder 343, cooperating with the foot 342 of the latch 341, to carry the latter, together with the arms 339 and 328, clockwise in unison until a rounded surface 345 on the bell crank 338 strikes the lower end of the depressed transaction key. This rocks the bell crank 338 and, through the arm 340, the latch 341 counter-clockwise to disengage the foot 342 from the shoulder 343, to arrest the clockwise movement of the arms 328 and 339 in positions corresponding to the depressed transaction key.

Disengagement of the latch 341 moves an extension 346 of the arm 340 into engagement with the corresponding one of a series of locating notches 347 in a plate 322 secured between the rod 208 and an upper extension of the plate 333. This maintains the differentially-adjustable arm 339 in the adjusted position.

After the latch 341 is disengaged from the shoulder 343, an arcuate surface 348 on the segment 335 moves opposite the foot 342 to maintain the latch 341 in its set position.

When the lever 331 reaches the terminus of its clockwise movement, a roller 349 thereon coacts with an arcuate surface of the usual minimum-movement beam 350, pivoted at one end to the differentially-adjustable arm 339 and bifurcated at its other end to engage the stud 351 in a link 352, and forces said beam upwardly to position the link 352 in proportion to the position of the transaction key depressed. The upper end of the link 352 is pivoted to a segment 353 secured to one of the tubes 244 on the shaft 245, while the lower end of the link is pivotally connected to a segment arm 354 free on the shaft 247.

The segment arm 354 is connected by a link 355 to an arm 356 secured on the shaft 252. Also secured on the shaft 252 is a segment gear 362, which meshes with the external teeth of an external-internal ring gear 357 rotatably mounted on a disk which in turn is supported by the shaft 255. The gear 357 has secured thereto a ring gear 358, which meshes with a pinion 359, secured on a shaft 360, journaled in the bracket 256. Other pinions 359 secured on the shaft 360 drive other internal-external gears, secured to the gear 358, which position transaction type wheels 361 (Fig. 6) located in the different columnar positions of the record material, so that a character indicating the transaction being performed will be recorded on said record material.

The tube 244 (Fig. 6), which is driven by the gear segment 353, is connected to another gear segment (not shown), which in turn is connected by a link to the totalizer line positioning cams 326 and 327 (Fig. 4) to cause said cams to be positioned in relation to the depressed transaction keys. As previously stated, the cams 326 and 327 are secured together, so that they move like extents when adjusted as just described.

The numbers 0 to 9 inclusive opposite the horizontal lines in the diagrammatic view of the totalizer selecting cams 326 and 327 (Fig. 4) indicate the positions to which these cams are adjusted under control of the various transaction keys. For example, the "1" position (Fig. 4) represents the position which is selected by the Overdraft key 158 when the balance totalizer contains a negative amount. The Overdraft key 158, which, through means to be described hereinafter, causes the differential to be arrested in the first position, is used in conjunction with the New Balance key 163 to clear the New Balance totalizer, to record the negative new balance and to simultaneously transfer said negative new balance to the total new balance minus totalizer 307 (TNB−). As mentioned before, the Overdraft key 158 does not cause an operation of the microswitch 85 (Fig. 9); therefore, upon depression of this Overdraft key 158 by itself, the release shaft 30 will not be released, and consequently the machine connot be operated. Therefore, when depressing said Overdraft key 158, it is necessary also to depress one of the keys 163, 164, 165, or 168 in the total row in order to release the machine for operation.

When this occurs, the Overdraft key 158 controls mechanism to arrest the differential latch associated therewith in the first position to select the minus side (wheel 301) (Fig. 4) of the balance totalizer on the No. 1 line, and the total new balance totalizer (wheels 307) on the No. 2 totalizer line. In this present machine, and according to the present invention, when an overdraft occurs, there is mechanism provided, as has been previously mentioned, to prevent an immediate subsequent operation of the machine by the depression of either the Check key 159 or the Deposit key 157. In other words, the machine is locked up; that is, it is locked against release and consequent operation whenever an overdraft is in the machine. This, as above mentioned, prevents an operator from entering a deposit which would be large enough to overcome the overdraft and thus put the cross-footer back on the plus side again. This, of course, would prevent the bank from knowing that the customer had an overdraft, and therefore the usual charge for overdrafts could not be charged against the customer because the bank would know nothing about it.

As above mentioned, this overdraft may or may not be printed upon the customer's statement and ledger sheet, depending upon the system which the bank uses in connection with overdrafts. However, the present invention is so constructed that this overdraft may be printed if the bank chooses to have it printed, or it may not be printed if the bank wishes that it be not printed on the customer's statement. However, the bank may have a record of it by simple depression of the Overdraft key 158 and the Indicate Balance key 165, the latter causing release of the machine by its control of the operation of the microswitch 85, which, as above mentioned, causes an operation of the solenoid 47, which in turn trips the mechanism to release the machine release shaft 30 in the manner previously described.

The mechanism for causing the Overdraft key 158, upon depression thereof, to control the first transaction bank differential will now be described.

Associated with this bank of keys, as shown in Fig. 6, is a control lever 385, pivotally mounted on the rod 210. This lever 385 has an integral upwardly-extending arm 386, normally held by a spring 389 against a stud 387 carried by one arm of a yoke 388. The yoke 388 is pivoted on a rod 390, mounted in the hanger plates 333.

The control lever 385 is connected by a link 391 to an arm 392 of a yoke 393, pivoted on a rod 394, suitably supported in the hanger plates. The yoke 393 is provided with another arm 395, the free end of which is adapted to be contacted by a lug 396 secured to a plate 397, integral with the upper portion of the arm 328. The arm of the yoke 388 is connected by a link 398 to an arm 399, pinned to the machine release shaft 30.

It will be seen from the above that, upon release and clockwise movement of the shaft 30, the yoke 388 will be rocked counter-clockwise, thus moving the stud 387 away from the arm 386 of the control lever 385. Since the Overdraft key 158 is depressed, its pin 69, cooperating with a lug 400 of the control lever 385, allows the spring 389 to rock the lever 385 and the yoke 393 both clockwise, whereupon the upper end of the arm 395 will be placed in front of the lug 396, and the lug 396 will therefore stop against the end of the arm 395 in the differential, in the first position, to select the minus side (wheel 301) of the balance totalizer.

The end of the Overdraft key 158 has been cut off, so that it will not be in the path of the arm of the bell crank 338, which causes the latch to be disconnected from the differential driver, and therefore the arm 395 and the lug 396 will, under control of the Overdraft key 158, cause the differential mechanism to stop in the "1" position.

If one of the transaction keys 154, 155, 156, 160, 161, or 162 is depressed, the lug 400 on the control lever 385 no longer controls the differential, and the spring 389 may then move the lever 385 and the yoke 393 to remove the arm 395 from the path of movement of the lug 396, whereupon the differential latch may be disengaged from the driving segment 335 in a position corresponding to the key which is depressed, as has been previously described.

However, when either the Check key 159 or the Deposit key 157 is depressed with the Overdraft key, the differential control lever 385 is prevented from being moved by the spring 389 because the lever 385 has integral thereon a lug 381, cooperating with the pin on the Deposit key 157, and a lug 382, cooperating with the pin 69 on the Check key 159. These lugs 381 and 382 are so positioned on the lever 385 that, upon depression of either one of these keys 157 or 159, its pin 69 moves down directly adjacent the lug 381 or 382, as the case may be, in such a position that the clearance between the pin 69 and the respective lug is so small that there can be no movement of the lever 385 by the spring 289, and consequently the plate 397, which is attached to the differential mechanism, can move under control of either the key 157 or 159, whichever is depressed, that key causing the arm 338 of the latch to contact its depressed end to control the setting of the differential in a position corresponding to whichever one of the keys 157 or 159 is depressed along with the Overdraft key 158.

The means under control of the crossfooter, to cause the machine to lock up upon an attempted entry of a check or a deposit immediately following an operation in which the crossfooter registers an overdraft, will now be described.

In previous commercial bank posting machines, the Overdraft key 158 is normally locked against operation but is released for operation when an overdraft occurs in the balance totalizer. However, as has been previously stated, in the present machine, when an overdraft occurs in the balance totalizer or crossfooter, the Overdraft key 158 is not locked against depression, since it is necessary to depress this key in conjunction with the Check key 159, the Deposit key 157, the Sub-Balance key 164, or the Indicate Balance key 165, in order to initiate an operation of the machine immediately subsequent to an operation in which an overdraft occurs.

Secured to the side of a higher order wheel 300 (Figs. 7 and 12) on the plus side of the balance totalizer is a disk 402 having a node 403 on its periphery. In subtracting, the balance totalizer is shifted from the position shown in Fig. 7 toward the left, where the minus wheel 301 is engaged with the amount differential actuator 205 and is rotated clockwise, which imparts a counterclockwise movement to the plus wheel 300 to rotate the latter reversely, as is well known, so that the highest order plus wheel passes from 0 to 9 when an overdraft occurs.

When the plus wheel 300 passes from 0 to 9 in an overdraft, the disk 402 will be rotated counter-clockwise, whereupon the node 403 will coact with a projection 437 on an arm 407 to rock the latter clockwise.

The arm 407 is secured by a hub 406 to a second arm 405, both of said arms and the hub being supported on a rod 408 (Fig. 12) carried at one end by a hanger plate 329, like the amount hanger plates 207, but for the highest order, and at its other end by a bracket 409, also secured to the plate 329. Carried by the arms 405 and 407 is a rod 410, embraced by an arm 411, secured to a shaft 412, suitably journaled in the left frame 20 and the hanger plate 333.

It will thus be seen that both arms 405 and 407 will be rocked clockwise together as a single unit, at which time the rod 410, coacting with the arm 411, will rock the latter and the shaft 412 clockwise. An arm 415 (Fig. 13), pivoted on the rod 390, carries a pin 417, embraced by one arm of a lever 418, loosely mounted on a previously-described shaft 77. The other arm of the lever 418 coacts with a stud 420 on a bar 421, slidably mounted on a stud 422 at one end and pivoted at its other end to an arm 423, which in turn is pivoted on a stud 424. Both of the studs 422 and 424 are carried by the transaction key frame 66.

The control bar 421 has an angular projection 426, normally held against the pin 61 of the Overdraft key 158 by a spring 427. A spring 428, connected to the lever 415, normally holds the upper end of the lever 418 in contact with the pin 420 of the control bar 421.

As has been previously explained, whenever an overdraft occurs in the machine, it is immediately detected upon an attempted subsequent operation of the machine by the depression of either the Check key 159 or the Deposit key 157. Therefore, as has been previously explained, to determine how much the overdraft is, the operator may depress the Overdraft key 158, which is retained in its depressed position by the previously-described detent 71 (Fig. 17), and then the operator may depress the Indicate Balance key 165, which is fully illustrated and described in the above-mentioned Spurlino et al. Patent No. 2,373,510, causing the amount of the overdraft to be indicated upon the indicator wheels 298 (Fig. 2).

This depression of the Overdraft key 158 moves the control bar 421 to the left and rocks the lever 418 counter-clockwise, which rocks the lever 415 clockwise.

The clockwise movement of the lever 415, through its stud 417, effects the control of the overdraft locking mechanism, which locks the key release shaft 30 in a manner to be described hereinafter.

To aline the arms 405 and 407, a plunger 433 (Fig. 12) is slidably mounted in a lug 434 on the bracket 409. The upper end of the plunger 433 has a notched head, which engages a stud 435, carried by the arm 405. A spring 436, wound around the plunger 433 and compressed between the lug 434 and the head on the plunger, constantly maintains the latter in engagement with the stud 435. When the arms 405 and 407 are rocked clockwise, the plunger 433 will rock counter-clockwise about its support a distance commensurate with the full extent of clockwise movement imparted to said arms, in which moved position the plunger 433 will retain said arms until the overdraft is removed from the balance totalizer.

When the overdraft is removed from the balance totalizer, the totalizer is again shifted toward the left (Fig. 7), if not already in such position, in an old and well-known manner, so as to engage the minus side of the totalizer (wheel 301) when the totalizer is moved into engagement with the amount differential actuators 205. Such shifting of the balance totalizer will again position the disk 402 so that the node 403 thereon will be opposite a projection 437 on the arm 407. After the balance totalizer has been moved into engagement with the amount differential actuators 205 and the minus wheel 301 is moved counter-clockwise thereby, the disk 402 will move clockwise therewith, and, since at this time the projection 437 on the arm 407 is in its clockwise (Fig. 12) or overdrawn position, the node 403 on the disk 402 cannot strike the projection 437.

During the negative balance operation, the minus wheels 301 are all reset to zero, and the plus wheels 300 are all set to 9. During the first adding operation following a negative balance operation, the totalizer wheels are shifted to the right (Fig. 7), where the node 403 of the disk is alined with the projection 404 and the arm 405. During this first adding operation following a negative balance operation, the highest order wheel 300 passes from 9 to 0 by reason of the tens transfer mechanism being tripped across the totalizer. When the highest order wheel plus passes from 9 to 0, the node 403 engages the projection 404 to rock the arms 405 and 407 counter-clockwise back to the position shown in Fig. 12 and, through the rod 410, impart a like movement to the arm 411 and the overdraft shaft 412.

If the bank wishes to permit a deposit to be entered into the balance totalizer after an overdraft and after having made a notation of said overdraft, an amount is added into the balance totalizer before the balance is taken, which amount is great enough to again change the condition of the balance totalizer from the overdrawn condition to a positive condition. The totalizer is then in the position shown in Fig. 7, with the positive wheel 300 in alinement with the actuator 205 and the disk 402 in alinement with the projection 404 of arm 405.

Now, when the balance totalizer wheel 300 is engaged with the actuator 205, the node 403 of the disk 402 is in position to engage the projection 404 of the arm 405 when the totalizer wheel passes from 9 to 0, at which time the totalizer changes from the overdrawn condition to the positive condition. This engagement rotates the arm 405 counter-clockwise back to the position shown in Fig. 7. As the arm 405 moves back into such position, the arm 411 and the shaft 412 are rocked counter-clockwise back to normal position.

The usual and well-known fugitive 1 mechanism is operated by the shaft 412 when rocked by the disk 403 in the manner shown and described in the above-mentioned Goldberg Patent No. 2,175,346 or in the Shipley Patent No. 1,791,907, so that the true negative balances may be printed.

When an overdraft occurs on the balance totalizer and the overdraft shaft 412 (Figs. 15 and 18) is rocked clockwise, as previously described, a hooked arm 466, loose on the shaft 412, is rocked clockwise also. In order to impart to the arm 466 a greater clockwise movement than that which the shaft 412 receives at this time, an indirect drive between said shaft and said arm is provided, which includes an arm 467, secured to the shaft 412. The arm 467 engages a pin 468 in another arm 469, free on the rod 390. The arm 469 engages a pin 470 in the arm 466. The hook portion of the arm 466 is normally engaged wtih a stud 471 on a lever 472, freely mounted on the rod 390. A spring 473 constantly tends to rock the arm 472 counter-clockwise but is normally prevented from doing so by engagement of the hooked arm 466 with the stud 471. The lever 472 carries a stud 474, which is embraced by an arm 475, freely mounted on the shaft 77. The arm 475 is hubbed to another arm 476 (Figs. 7 and 15) having a surface 477, which is normally out of the path of movement of a lug 478 on an arm 479 secured to the machine release shaft 30.

When the arm 466 is disengaged from the stud 471, the spring 473 cannot rock the lever 472 counterclockwise because an arm 480 (Fig. 14), hubbed to the lever 472, carries a stud 481 contacting a surface 482 on an arm 483 free on the shaft 77, thus preventing counter-clockwise movement of the arm 480 and consequently of the lever 472 by the spring 473.

A spring 484 normally maintains the arm 483 in co-operative relationship with the stud 481 on the arm 480. A finger 485 of the arm 111 coacts with the under side of a stud 486 in the arm 483. As previously described, the arm 111 embraces the stud 110 on the operating bar 102, mounted in the total key bank.

Each of the keys 163 to 168 inclusive, as above mentioned, carries a stud 90, and, upon depression of any one of the keys 163, 164, 165, and 168, its stud 90 coacts with the cam surface 100 on the bar 102 to cam the latter downwardly against the action of the spring 104, as has been previously described. Such downward movement of the bar 102 rocks the finger 485 counterclockwise, causing the latter to coact with the stud 486 to rock the arm 483 counterclockwise to disengage its surface 482 from the stud 481.

When this occurs, the spring 473 will rock the arm 480 and the lever 472 counter-clockwise, which will, through the stud 474, rock the arms 475 and 476 sufficiently clockwise to position the surface 477 on the latter in the path of movement of the lug 478 on the arm 479, to prevent clockwise movement of the last-mentioned arm and the machine release shaft 30, and thus prevent release of the machine for operation.

However, if the Overdraft key 158 is first depressed before operation of any one of the total keys 163, 164, 165, and 168, the stud 417 of the arm 415 will be positioned so as to coact with the surface 491 of the arm 475 and prevent any clockwise movement of this arm 475 and the arm 476, thereby permitting clockwise movement of the arm 479 and the shaft 30 to release the machine for operation.

Since the total keys 166 and 167 exercise no control over the No. 1 totalizer line, the bar 102 is cut away, so that, upon depression of either one of said keys, the studs 90 thereon will have no camming action on said bar 102.

Near the end of the operation of the machine, the machine release shaft 30 is given a counterclockwise movement, as previously described. When this occurs, an arm 492 (Fig. 16), secured to the shaft 30, will, through a pitman 493 and a stud 494 on the lever 472, rock said lever 472 and the arm 480 sufficiently clockwise to again engage the stud 481 (Fig. 14) with the surface 482 of the arm 483. Upon counterclockwise movement of the shaft 412 to its normal position, the hook-shaped arm 466 will again engage the stud 471 on the lever 472, as shown in Fig. 15.

*Overdraft detection*

From the above description it can be clearly seen that whenever an overdraft occurs in the balance totalizer, and the stud 481 is released from the lever 483 upon depression of any one of the keys 163, 164, 165, or 168, along with the depression of the Overdraft key 158, the machine release shaft 30 may be released because the stud 417 has been moved upwardly by depression of the Overdraft key 158, through the medium of the operating bar 421, the lever 418 (Fig. 13), and the lever 415, which carries the stud 417, said stud being moved upwardly against a surface 491 of the lever 475, and consequently prevents any clockwise movement of the lever 475 and its connected arm 476.

However, should an attempt be made to enter a check by the depression of the Check key 159 or enter a deposit by means of the Deposit key 157, or to take a new balance by pressing either of the keys 163 or 168 when there is an overdraft in the balance totalizer, the release of the stud 481 by movement of the lever 483, by means to be described hereinafter, will permit the spring 473 to rock the lever 472 counterclockwise, which rocks the arm 475 and the arm 476 clockwise, to position the surface 477 of the arm 476 in front of the lip 478 of the arm 479, which is secured to the machine release shaft 30. Consequently, the machine cannot be released, the operator is immediately apprised of the fact that the balance totalizer contains an overdraft, and at this time she will notify the bookkeeper, who will determine, according to the bank's policies, whether or not the overdraft shall be printed on this particular customer's ledger card. With the machine so locked against operation, it is necessary to release the depressed Check key 159 or Deposit key 157 or a new balance key 163 or the new balance NT key 168 which might have been depressed and to restore the parts; namely, the arm 480 (Fig. 14), lever 472 and arm 475 (Fig. 15), the arm 476 and the arm 479 to normal positions. Therefore, the operator moves the usual manual release knob 521 (Fig. 8) downwardly. Such downward movement of this knob 521, by means hereinafter described, rocks the machine release shaft 30 counterclockwise (Figs. 8, 15 and 16), thus rocking the arms 479 and 492 counterclockwise. The counterclockwise movement of the arm 492, by means of the pitman 493 rocks the lever 472 and the arm 480 clockwise against the action of the spring 473 to restore the stud 481 to normal position (Fig. 14) whereupon the spring 484 restores the arm 483 to again latch the arm 480 and lever 472 in their normal positions shown in Fig. 14.

Figures 12, 13, 14, 15, 16, 17, 18, 19:
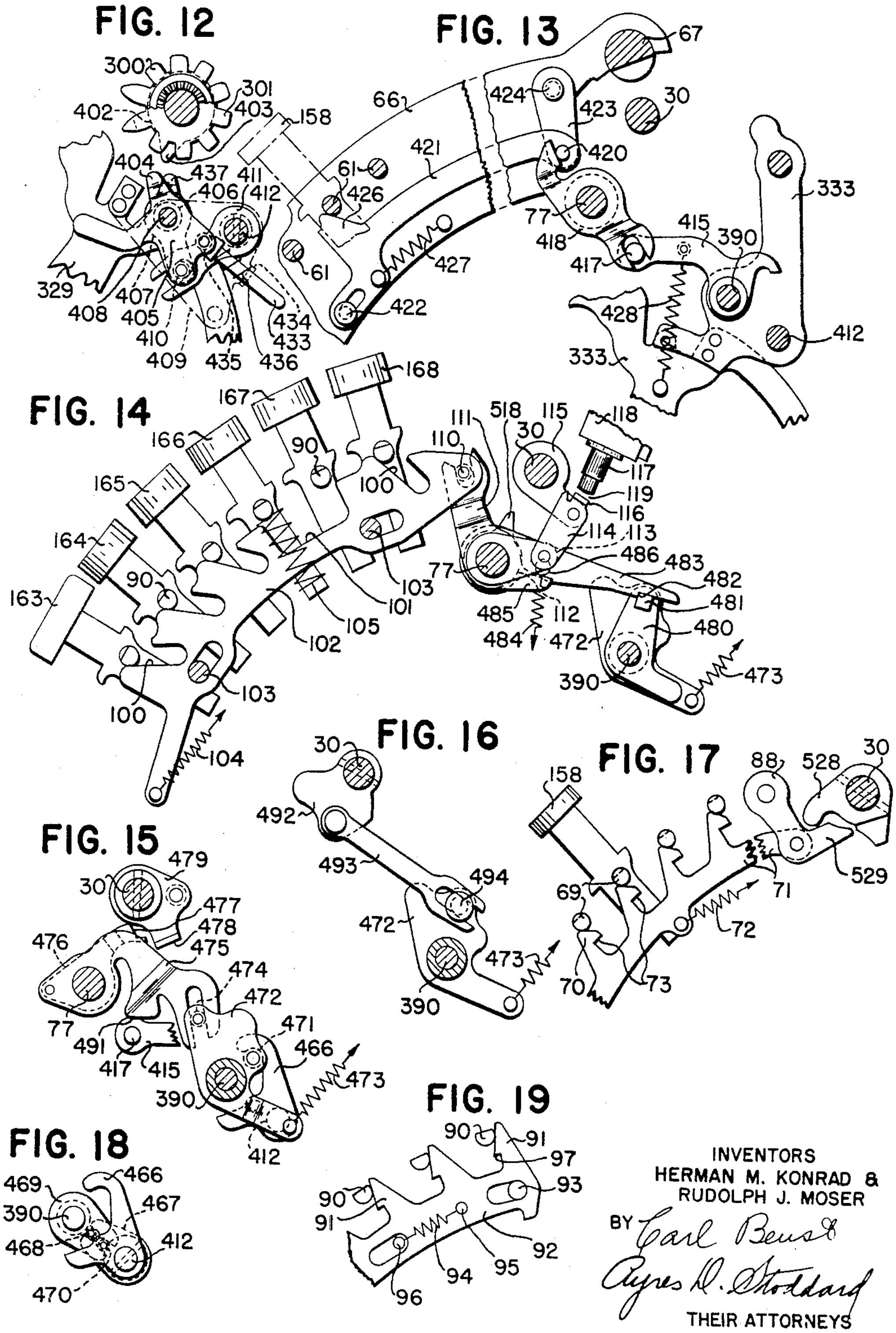
Fig. 12 is a detail view of the overdraft mechanism for the crossfooter on the upper totalizer line.
Fig. 13 shows a portion of the overdraft key control of the machine release locking mechanism.
Fig. 14 shows part of the overdraft control means to prevent release of the machine by the total keys associated with the crossfooter on the upper line when the crossfooter is in an overdrawn or minus condition, and also shows a part of the solenoid trip for the machine release mechanism.
Fig. 15 shows the remaining part of the overdraft controlling mechanism of Fig. 14.
Fig. 16 is a detail view of the means to restore the overdraft mechanism of Figs. 14 and 15.
Fig. 17 shows the means for retaining the overdraft key, the deposit key, and the check key in their depressed positions when they are operated.
Fig. 18 is a detail of the overdraft latch which controls the machine release mechanism.
Fig. 19 shows a part of the retaining detent for the control keys of Fig. 14.

This clockwise movement of the lever 472, through the stud 472, rocks the arms 475 and 476 counterclockwise to their normal positions shown in Fig. 15, which is permitted because the arm 479 on being restored to normal by the movement of the shaft 30, moves the lip 478 to the right and away from the surface 477 of the arm 476. Thus, with the arms 475 and 476 back in their normal positions, if the amount of the overdraft is to be printed, the Overdraft key 158 is depressed, the depression of which, as has been previously stated, causing the lever 415 to rock clockwise, thus moving the stud 417 upwardly to prevent any movement of the arms 475 and 476 and preventing the surface 477 from getting in front of the lip 478; consequently the machine release shaft 30 can be released and an operation of the machine made by depression of the combined Overdraft key 158 and one of the keys 163, 164, 165, or 168. If, as has been previously stated, the overdraft is to be shown on the ledger card, then the operator will depress the Sub-Balance key 164, along with the Overdraft key, thus causing a sub-total operation of the machine and causing a sub-total of the balance totalizer, which in this case is an overdraft, to be printed upon the customer's statement-ledger card.

After the sub-total of the overdraft has been printed or has not been printed, according to the bank's instructions, the operator may then proceed to enter a subsequent check or enter a deposit in the balance totalizer. However, this must be accomplished by the combined depression of the Overdraft key 158 and the Check key 159 if another check is to be entered, or the combined depression of the Overdraft key 158 and the Deposit key 157 if a deposit is to be entered.

Associated with the Deposit key and the Check key, as shown in Fig. 11, is a control bar 511, pivoted on arms 512 and 513, which in turn are pivoted on the transaction key frame 66. This control bar 511 has two angular lugs 514 and 515 associated with the pins 69 of the Deposit key 157 and the Check key 159, respectively.

Integral with the control bar 511 is an arm 516, carrying a pin 517, adapted, when the bar 511 is moved to the left and downwardly, to contact an arm 518, which is secured to the previously-described lever 483.

The angular lugs 514 and 515 on the bar 511 are such that, whenever the Check key 157 or the Deposit key 159 is depressed, immediately following an operation in which the balance totalizer went from a plus condition to a minus condition, or, in other words, contained an overdraft, the movement of the bar 511 by the depression of either one of these two keys, through the pin 517, rocks the arm 518 counterclockwise, and, since this arm 518 is integral with the arm 483, the latter is rocked counterclockwise, thus releasing the pin 481, whereupon the spring 473 (Figs. 11 and 15) rocks the arm 472 counterclockwise, which, through the stud 474, rocks the arms 475 and 476 clockwise to position the surface 477 in front of the lip 478, thus preventing any movement of the machine release shaft 30 and consequently preventing an immediate operation of the machine when the balance totalizer contains an overdraft.

Now, as above stated, the operator is immediately apprised of the fact that the machine contains an overdraft because she cannot enter another check, nor can she enter a deposit. Therefore, she must tell the head bookkeeper, who then will determine, according to the bank's policies, whether or not the overdraft shall be shown on this particular customer's statement-ledger card.

If more checks are to be registered, or if a deposit is to be registered, the operator may depress the Overdraft key 158, which, it will be remembered, rocks the lever 415 clockwise and moves the pin 417 upwardly against the surface 491 of the arm 475. Now, when the operator depresses either the Check key 157 or the Deposit key 159, which releases the stud 481, the spring 473 cannot rock the arms 475 and 476 clockwise; consequently the surface 477 will not be positioned in front of the lip 478, and therefore the machine release shaft 30 may be operated and the machine operated through a regular cycle of operation.

When either the Check key 157 or the Deposit key 159 is depressed without the Overdraft key 158 having been depressed first, such depressed key 157 or 159 is retained in its depressed position by the retaining detent 71, shown in Fig. 17. Therefore during such depression of either the Check key 157 or the Deposit key 159, the machine release shaft 30 is partially operated and, thereby, by the mechanism well-known in the art and partly shown in Fig. 17, and fully shown in Fig. 2 of United States patent to Samuel Brand No. 1,917,355, it is impossible to depress the undepressed one of the two keys 157 or 159 and consequently it will be necessary to release the key, either 157 or 159, which has been depressed.

In order to do this, the operator moves the usual knob 521 (Fig. 8) downwardly. This knob is connected to a lever 522, pivoted at 523 to the machine frame 20. Pivoted to the lever 523 is a link 524, having a slot 525, into which projects a pin 526 of an arm 527, secured to the machine release shaft 30.

Downward movement of the lever 522 by the knob 521, through the link 524 and the pin 526, rocks the arm 527 and consequently the machine release shaft 30 counterclockwise, whereupon an arm 528, secured to the shaft 30, contacts an arm 529 of the detent 71, thus moving the retaining detent 71 downwardly (Fig. 17) in a manner which is well known in the art, thus releasing any depressed key in this transaction bank.

When the machine is released for operation, the arm 527 is rocked clockwise, and a finger 530 thereon enters a notch 531 in the lever 522, thus preventing any movement of the knob 521 and the lever 522 after the machine has been released.

*Combined statement-ledger card*

In Figs. 20 and 21 is shown a combined statement-ledger card 532. In Fig. 20, the ledger card shows all of the entries pertaining to a particular customer, John Doe, wherein he has had the Balance Forward picked up, and several checks have been issued and deposits have been made, but in this statement there are no overdrafts shown. This statement-ledger sheet is one used in connection with a machine which was not provided with the present invention, which contains the automatic overdraft detection lock, which has been previously described.

However, in Fig. 21, the overdrafts in connection with John Doe's account are printed, and those overdrafts are shown at 533 on the statement and 534 on the ledger card, and then again at 535 on the statement and 536 on the ledger card.

These overdrafts are printed by the machine embodying the present invention when the Overdraft key 158 and the Sub-Balance key 164 are depressed to control the release of the machine when there is an overdraft in the machine.

Printing on the statement-ledger sheet in Figs. 20 and 21 is accomplished by means of the printing mechanism, not shown herein but fully illustrated and described in the above-mentioned Spurlino et al. Patent No. 2,373,510.

*Printer drive shaft*

In Fig. 3 the printer drive shaft 550 is shown. This shaft is driven by means of gears 551 and 552, the latter being mounted on a stud 553. The gear 552 meshes with the gear 555 on the shaft 556, which is in axial alinement with the machine-operating shaft 60.

While the form of mechanism shown and described herein is admirably adapted to fulfill the objects primarily stated, it is to be understood that it is not intended to confine the invention to the one form or embodiment herein disclosed, for it is susceptible of embodiment in various other forms.

What is claimed is:

1. In a machine of the class described, the combination of a balance totalizer; machine release mechanism; a plurality of depressible control keys, the operation of any one of which causes an operation of said machine release mechanism; means adapted to be moved into position to block the operation of the machine release mechanism, said means being normally in an ineffective position; devices controlled by said totalizer when the latter is in a negative condition to partially release said blocking means; and means actuated by any one of said keys upon depression thereof, when the totalizer is in a negative condition, to complete the release of said blocking means to render the latter effective to prevent operation of the machine release mechanism.

2. In a machine of the class described, the combination of a balance totalizer; machine release mechanism; a plurality of depressible control keys, the operation of any one of which causes an operation of said machine release mechanism; means adapted to be moved into position to block the operation of the machine release mechanism, said means being normally in an ineffective position; devices controlled by said totalizer when the latter is in a negative condition to partially release said blocking means; means actuated by any one of said keys upon depression thereof, when the totalizer is in a negative condition, to complete the release of said blocking means to render the latter effective to prevent operation of the machine release mechanism; and another depressible key to render said devices and the means which completes the release of the blocking means ineffective.

3. In a machine of the class described, the combination of a balance totalizer; machine release mechanism; a plurality of depressible control keys, the operation of any one of which causes an operation of said machine release mechanism; means adapted to be moved into position to block the operation of the machine release mechanism, said means being normally in an ineffective position; devices controlled by said totalizer when the latter is in a negative condition to partially release said blocking means; means actuated by any one of said keys upon depression thereof, when the totalizer is in a negative condition, to complete the release of said blocking means to render the latter effective to prevent operation of the machine release mechanism; another depressible key; and means actuated by depression thereof to prevent movement of said blocking means.

References Cited in the file of this patent

UNITED STATES PATENTS

| | | |
|---|---|---|
| 1,731,701 | Bernau | Oct. 15, 1929 |
| 2,353,938 | Spurlino et al. | July 18, 1944 |
| 2,358,154 | Fettig | Sept. 12, 1944 |
| 2,417,563 | Moser | Mar. 18, 1947 |
| 2,639,857 | Spurlino et al. | May 26, 1953 |